UNITED STATES PATENT OFFICE.

GEORGE E. VANDERBURGH, OF MAMARONECK, NEW YORK, ASSIGNOR TO THE LIQUID QUARTZ COMPANY, OF NEW YORK.

IMPROVEMENT IN SILICATED CEMENTS.

Specification forming part of Letters Patent No. 28,541, dated May 29, 1860.

*To all whom it may concern:*

Be it known that I, GEORGE E. VANDERBURGH, of Mamaroneck, in the county of Westchester and State of New York, have invented an Improved Substitute for Glue, Gum, &c.; and I do hereby declare that the following is a full, clear, and exact description of the nature of the same.

I have discovered that the dissolved silica manufactured under the patent of Benjamin Hardinge, reissued January 22, 1856, possesses peculiar adhesive properties when applied as a substitute for glue; and I believe that such application of dissolved silica was never contemplated by the said inventor or any other person, and hence I intend to claim the said liquid silica as a substitute for glue, gum, &c., in all the various uses to which it may be applicable. The peculiar fitness of this liquid silica as an adhesive material may be appreciated by a consideration of its drying properties, its water-proof character, its power of adhering firmly to most substances, &c. I shall only, however, enumerate some of the purposes in which its especial properties for taking the place of glue have been tested and proved highly satisfactory, and other uses will doubtless suggest themselves to parties interested.

In the manufacture of sand, glass, emery, and similar paper or cloth—as for coating and grinding or abrading surface with fine mineral particles—this dissolved quartz is especially applicable as uniting with the actual article, instead of simply forming a socket, as with glue, into which each particle is retained, in fastening pieces of wood together, in attaching leather or similar substances, in binding books, in sizing paper, in attaching fibrous substances, in coating and rendering waterproof any fibrous substance, in making paint by the admixture with earthy or metallic substances, in coating iron and other articles with a transparent varnish; and said liquid silica may be used for hermetically sealing fruit, eggs, or for sealing bottles and similar articles, and as a substitute for starch or gum in sizing fibrous substances, such as paper, articles of wearing-apparel, cloths, &c. Said liquid silica may be prepared exactly in accordance with the patent of said Hardinge; or the same may be slightly varied therefrom or have ingredients mixed therewith.

Having thus described my said invention, what I claim, and desire to secure by Letters Patent, is—

The substitute for glue and gum formed by the adhesive material specified, for the purposes set forth.

In witness whereof I have hereunto set my signature this 20th day of February, 1860.

GEORGE E. VANDERBURGH.

Witnesses:

LEMUEL W. SERRELL,
CHAS. H. SMITH.